United States Patent
Marten et al.

(10) Patent No.: US 6,329,473 B1
(45) Date of Patent: Dec. 11, 2001

(54) AMINE-MODIFIED EPOXY RESIN COMPOSITION

(75) Inventors: Manfred Marten, Mainz; Claus Godau, Kiedrich, both of (DE)

(73) Assignee: Solutia Germany GmbH & Co., KG, Mainz-Kastel (DE)

( * ) Notice: Subject to any disclaimer, the term of this patent is extended or adjusted under 35 U.S.C. 154(b) by 0 days.

(21) Appl. No.: 08/408,983

(22) Filed: Mar. 23, 1995

(30) Foreign Application Priority Data

Mar. 28, 1994 (DE) .................................................. 44 10 785

(51) Int. Cl.$^7$ ....................................................... C08F 20/00
(52) U.S. Cl. ........................... 525/438; 525/524; 525/526; 528/93; 528/103; 528/111; 528/119; 528/120; 528/122; 528/123; 528/124
(58) Field of Search ..................................... 525/438, 524, 525/526; 528/93, 103, 111, 119, 120, 122, 123, 124

(56) References Cited

U.S. PATENT DOCUMENTS

| | | | |
|---|---|---|---|
| 3,518,220 | 6/1970 | Landua et al. | 260/37 |
| 3,536,654 * | 10/1970 | Lantz et al. | 528/93 |
| 3,538,039 | 11/1970 | Lantz et al. | 260/37 |
| 3,914,204 * | 10/1975 | Helm et al. | 528/120 |
| 3,993,707 * | 11/1976 | Cummings | 528/120 |
| 3,996,186 | 12/1976 | Schreiber et al. | 260/37 |
| 4,088,633 | 5/1978 | Gurney | 260/47 |
| 4,145,370 * | 3/1979 | Sreeves | 260/835 |
| 4,147,737 | 4/1979 | Sein et al. | 260/835 |
| 4,176,143 | 11/1979 | Kraft et al. | 260/835 |
| 4,195,153 | 3/1980 | Waddill | 528/94 |
| 4,316,003 | 2/1982 | Dante et al. | 528/111 |
| 4,420,606 * | 12/1983 | Waddill | 525/504 |
| 4,423,170 | 12/1983 | Waddill | 523/417 |
| 4,608,300 * | 8/1986 | Gruber | 528/120 |
| 4,886,867 | 12/1989 | Lin et al. | 528/111 |
| 5,250,634 * | 10/1993 | Toyoda et al. | 525/438 |

FOREIGN PATENT DOCUMENTS

| | | |
|---|---|---|
| 38 03 508 | 8/1989 | (DE) . |
| 0 496 163 | 7/1992 | (EP) . |
| 0 510 265 | 10/1992 | (EP) . |
| 13 61 909 | 6/1972 | (GB) . |
| 25 28 201 | 1/1977 | (JP) . |

* cited by examiner

*Primary Examiner*—Robert Dawson
(74) *Attorney, Agent, or Firm*—Foley & Lardner

(57) ABSTRACT

Epoxy resin compositions comprising polyepoxides having at least two 1,2-epoxide groups, which can be obtained by reaction of diepoxides or polyepoxides or mixtures thereof with monoepoxides, and one or more amines sterically hindered amines, such as disecondary polyoxyalkylenediamines, and/or diprimary diamines, if desired with the addition of further 1,2-epoxide compounds and also hardeners, and use thereof as a coating for crack bridging, as an adhesive and in powder surface coatings.

26 Claims, No Drawings

AMINE-MODIFIED EPOXY RESIN COMPOSITION

BACKGROUND OF THE INVENTION

Epoxy resins, in particular those which are prepared from bisphenol A and epichlorohydrin, are known raw materials for preparing high-quality casting resins, coating compositions and adhesives. The aromatic epoxy resins cured by means of polyamines possess, besides good resistance to chemicals and solvents, good adhesion to many substrates. Bisphenol A epoxy resins having as low as possible a viscosity and able to be processed without solvents are, inter alia, of considerable importance for the protection and the renovation of concrete constructions. The curing of the epoxy resins can be carried out using polyamines at ambient temperature. However, the usability of the epoxy resin/polyamine systems is frequently limited by insufficient elasticity or flexibility in the crosslinked state. Durable bridging of cracks requires coating materials which, owing to their high elasticity, "work" over the crack and can in this way absorb high temperature-change stresses by means of high stretchability. In addition, the adhesives sector requires elastic epoxy resin systems which still have sufficient elasticity at low temperatures (e.g., down to −20° C.).

In principle, it is indeed possible to increase the elasticity of epoxy resin systems externally by addition of plasticizers or internally by reducing the crosslinking density. However, external elasticifying agents are not reactive and are not incorporated into the thermoset network. External plasticizers which can be used are tar, phthalic esters, high-boiling alcohols, ketone resins, vinyl polymers and other products which do not react with epoxy resins and amine hardeners. However, this type of modification is limited to only specific fields of application, since it has a series of disadvantages. For example, these additives lead to great disruption of the thermoset structure, have a plasticizing effect limited at low temperatures, tend to sweat out on thermal stressing and ageing, and the cured systems become brittle. For internally increasing the elasticity, additions are made of compounds which react with the epoxy resins or hardeners and are included in the crosslinking. In detail, the elasticizing action is achieved by incorporation of long-chain aliphatic or strongly branched additives into the resin or hardener component. To be able to process the resin/hardener systems without problems, the starting components should have viscosities which are as low as possible.

U.S. Pat. No. 3,538,039 discloses hot-curing mixtures comprising (1) an adduct of a polyepoxide and amine, (2) a polyfunctional anhydride and (3) an accelerator for the anhydride. The adduct is preferably built up from a polyepoxide and aromatic amines such as aniline, m-aminophenol, m-phenylenediamine, and methylenedianiline.

U.S. Pat. No. 3,518,220 discloses hot-curable epoxy resin mixtures comprising (1) an epoxy-group-containing adduct of a polyepoxide containing more than 1.0 vic. epoxy groups and an aromatic amine having at least two active hydrogens on nitrogen and (2) 3-aminopyridine. Amines used are, inter alia, methylenedianiline, aniline, m-aminophenol, and m-phenylenediamine.

DE-A 38 03 508 describes a cold-curing, warm post-crosslinkable resin based on epoxide, obtainable by reaction of a bifunctional epoxide of the formula $$E—X—E \tag{I}$$

where
E is in each case a radical having an epoxide function and
X is a divalent organic radical, with a secondary diamine of the formula

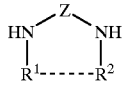
(II)

where
R$^1$ and R$^2$ can be identical or different and are each hydrocarbon radicals which can be connected to one another to form a ring system, and
Z is a divalent hydrocarbon radical.

The epoxy resin used is preferably the diglycidyl ether of bisphenol A and the dialkylalkylenediamines used are preferably, for example, N,N'-dimethylethylenediamine and N,N'-diethylethylenediamine. This epoxy resin is used as an adhesive, for coatings and also as matrix composition.

EP-A 496,163 describes a cured epoxy resin containing the reaction product of:
A. a polyepoxide;
B. a chain lengthening agent selected from among compounds having the formula 1 or 2;

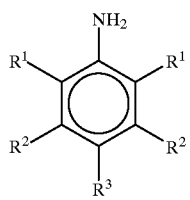
1

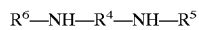
2

C. if desired, a catalyst for the reaction between polyepoxide and chain lengthening agent; and
D. if desired, a dihydroxy hydrocarbon compound which can also contain halogen substituents;
where
R$^1$, R$^2$ and R$^3$ are each, independently of one another, hydrogen or a substituent which does not significantly influence the reaction between the primary amines and the epoxide groups and which does not catalyze the reaction of epoxide groups with one another;
R$^4$ is a C$_{1-20}$ alkylene, C$_{5-20}$ cycloalkylene, or C$_{6-20}$ arylene group, where these groups can, if desired, be substituted by further groups which have no influence; and
R$^5$ is in each case, independently of one another, a C$_{3-20}$ secondary or tertiary alkyl, a C$_{5-20}$ cycloalkyl or C$_{6-20}$ aryl group, where these groups can, if desired, be substituted by further groups which have no influence; with the proviso that at least one of the groups R$^1$ or two of the groups R$^2$ and R$^3$ must not influence the reaction.

These chain-lengthened solid epoxy resins are used, inter alia, for powder coating. They have relatively high softening points and relatively high melting points at a lower epoxide equivalent weight compared with the conventionally lengthened epoxy resins. "Epoxide equivalent weight" is the molecular weight of the compound concerned based on the number of epoxide groups ("EV").

One embodiment of EP-A 496,163 relates to the aqueous dispersions of amine-lengthened epoxide resins comprising (i) the reaction product of
A. a polyepoxide;
B. a chain lengthening agent corresponding to one of the formulae 1, 2 (see above) and 17;

$$R^{11}\text{---}NH_2 \qquad\qquad 17$$

C. if desired, a catalyst for the reaction between polyepoxide and chain lengthening agent and
D. if desired, a dihydroxy hydrocarbon compound which can also contain halogen substituents;

(ii) a dispersant in a sufficient amount to disperse the composition in water;
(iii) if desired, a solubilizer; and
(iv) water; where $R^{11}$ is a linear or branched, unsubstituted or hydroxy-substituted $C_{4-20}$ alkyl group.

Besides the above-mentioned amines 1 and 2 as component B, for the epoxy resin dispersed in water use is additionally made in the component (i) B of compounds of the formula (17) $R^{11}$—$NH_2$. No more details about the type of any branching of the radical $R^{11}$ are given in the patent. Chain lengthening agents used are n-hexylamine in Example 8 and n-octylamine in Example 12.

The aqueous embodiment of EP-A 496,163 concerns complex mixtures in which solid resins are supposed to be prepared as stable dispersions in water. Applications given for these dispersions are, inter alia, coatings for ambient temperature curing, in paper latex, in cement dispersions and in other water-containing coatings.

U.S. Pat. No. 4,886,867 describes, inter alia, a method for preparing difunctional epoxy resins of the formula

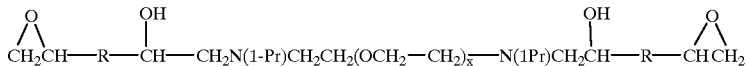

where R is derived from a bisphenol A diglycidyl ether radical and x=2 to about 10, by reaction of excess epoxy resin with a secondary isopropylamine derivative of a primary polyoxyalkylenediamine or polyoxyalkylenetriamine in the presence of acetone (iPr=iso-propyl radical).

The reaction of the amine component with the bisphenol A epoxy resin is critical. To prevent gel formation, a solvent has to be added in the preparation of the adduct. Suitable solvents are ketones and alcohols, particularly preferably acetone. The difunctional epoxy resins can, depending on the starting material, be solid or liquid and in the cured state give a transparent, flexible, rubber-like material. The examples show that the diepoxides based on bisphenol A resin (Epon® 828) are semi-solid products and those based on Eponex® 151 (hydrogenated Epon® 828) are indeed liquid but have very high viscosities (cf. Table I p. 9/10).

According to U.S. Pat. No. 4,316,003, there is obtained an adduct for curing epoxy resins, particularly for aqueous systems, by first reacting, in a first step, excess epoxy resin with a primary monoamine and then reacting the epoxide obtained in a second step with an excess of a polyfunctional amine. The products of the first step are prepared in the presence of solvents and are directly processed in the second step to give the amine hardener. No statements are made about the storage stability and about possible use of step 1.

SUMMARY OF THE INVENTION

It is an object of the present invention to provide reactive, flexible coatings and adhesives which adhere well to a wide variety of substrates and which still have high elasticity even at low temperatures, i.e., 0° C. and below, e.g., down to −20° C. It is advantageous if the epoxy resins have viscosities which make possible easy processing without additional equipment. Particularly advantageous are epoxy resins which have very low viscosities, i.e., which have viscosity values significantly below those of liquid bisphenol A epoxy resins.

It is also an object of the invention to provide methods of making and using such coatings and adhesives.

In accordance with these objects, there has been provided an epoxy resin compositions comprising
(A) a compound which contains at least two 1,2-epoxide groups and which is the reaction product of
(A1) one or more compounds containing at least two 1,2-epoxide groups, optionally in admixture with one or more monoepoxides, and
(A2) one or more amines selected from
(A21) amines of the formula I

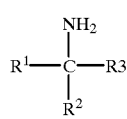

where
$R^1$ is an aliphatic, cycloaliphatic, araliphatic or aromatic hydrocarbon radical, each of which may be branched or unbranched, each having from 1 to 30 carbon atoms, each which may be unsubstituted or substituted by one or more of hydroxy, alkoxy, or halogen groups, $R^2$ and $R^3$ are each, independently of one another, hydrogen or one of the radicals specified under $R^1$, with the proviso that the amino group ($NH_2$) is not directly bonded to an aromatic and, in the case of $R^2$ and $R^3$ being hydrogen, the remaining radical $R^1$ is one of the following substituents

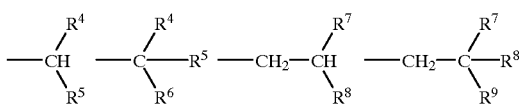

where the radicals
$R^4$ to $R^9$ are each, independently of one another, an aliphatic, cycloaliphatic, araliphatic or aromatic hydrocarbon radical, each of which may be branched or unbranched, each having from 1 to 30 carbon atoms, each which may be unsubstituted or substituted by one or more of hydroxy, alkoxy, or halogen groups, and
$R^1$ and $R^2$ can form an unsubstituted or substituted cycloaliphatic ring having up to 8 carbon atoms, where $R_3$ is then a hydrogen atom, the substituents being chosen from lower alkyl (C1–C4), lower alkoxy (C1–C4), halogen, and dialkyl (C1–C4)amino groups, or (A22) amines of the formula II

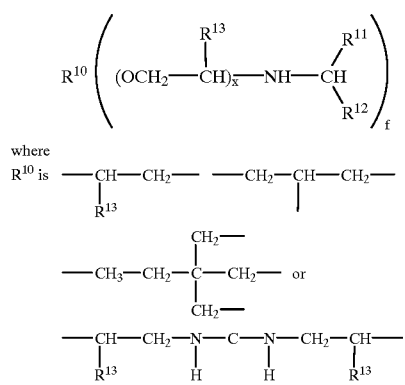

where
$R^{10}$ is —CH—CH$_2$— —CH$_2$—CH—CH$_2$—
         |                    |
         $R^{13}$ —CH$_3$—CH$_2$—C(CH$_2$—)(CH$_2$—)—CH$_2$—  or —CH—CH$_2$—N—C—N—CH$_2$—CH—
  |         |   |        |
  $R^{13}$  H   H        $R^{13}$ $R^{11}$ and $R^{12}$ are each, independently of one another, hydrogen, a saturated or unsaturated straight-chain, branched or cyclic, with or without heteroatoms in the ring, alkyl having up to 15 carbon atoms, or $R^{11}$ and $R^{12}$ together can form a cyclic alkylene radical having up to 8 carbon atoms, which is unsubstituted or monosubstituted, disubstituted or trisubstituted by alkyl groups having from 1 to 3 carbon atoms, $R^{13}$ is hydrogen or methyl, x is an integer from 1 to 100, and f is 2 or 3,
   wherein the $R^{11}$, $R^{12}$, and $R^{13}$ groups can vary in the repeating units; or
   (A23) diprimary diamines of the formula III

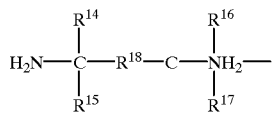

where
$R^{14}$ to $R^{17}$ are independently hydrogen or an alkyl group having from 1 to 8 carbon atoms, and $R^{18}$ is a direct bond, a linear, branched or cyclic, unsubstituted or substituted alkylene group or an arylene or heteroarylene group, the substituents being chosen from lower alkyl (C1–C4), lower alkoxy (C1–C4), halogen, and dialkyl (C1–C4)amino groups, with the proviso that at least one of the radicals $R^{14}$ to $R^{17}$ is an alkyl group if $R^{18}$ is a direct bond or a linear alkylene group; and $R^{14}$ together with $R^{16}$ or $R^{18}$ and the atoms connecting them can form a cycloaliphatic, aromatic, or heteroaromatic ring;

(B) optionally one or more of 1,2-epoxide compounds which is different from that of (A1) or is the unreacted proportions of the compounds (A1) from the preparation of the compounds (A), (C) one or more hardeners, and (D) optionally, further additives.

In accordance with other objects of the invention, there are provided coating and adhesive compositions comprising the above coating.

In accordance with another aspect of the invention, there is provided a substrate coated with the coating and adhesives.

Further objects, features, and advantages of the present invention will become apparent from the detailed description of preferred embodiments that follows.

DETAILED DESCRIPTION OF THE PREFERRED EMBODIMENTS

It has now surprisingly been found that reaction products (A) of, for example, aliphatic (polyoxyalkylene) glycidyl ethers (A 11) and certain amines, including sterically hindered monoamines (A 21) and/or certain disecondary polyetherdiamines (A 22) give low-viscosity and, particularly surprising to those skilled in the art, storage-stable epoxide systems which can be processed by curing to give outstandingly low-temperature-elastic, crack-bridging coatings and adhesives.

The solid epoxides (A) of the invention, e.g., obtained from bisphenol A or F glycidyl ethers (A 12) and certain sterically hindered monoamines (A 21), can be mixed with the liquid epoxides (A) of the invention to produce products having any intermediate viscosities.

In one embodiment, the solid epoxides (A) of the invention can be used as powder resin components for coatings and adhesive bonding of substrates.

Compounds suitable as component (A1) include any such compounds, and are many of those compounds known for this purpose which contain on average more than one epoxide group, preferably two epoxide groups, per molecule. However, mixtures of polyepoxides with monoepoxides can also be used. These epoxide compounds (epoxy resins) can be either saturated or unsaturated, and aliphatic, cycloaliphatic, aromatic or heterocyclic and can also contain hydroxyl groups. They can further contain such substituents which do not cause interfering side reactions under the mixing or reaction conditions, for example alkyl or aryl substituents, ether groups, and the like.

The compounds (A1) may have any desired epoxide equivalent weight, and preferably have epoxide equivalent weights of from 100 to 500 g/mol.

They are preferably those glycidyl ethers (A 12) which are derived from polyhydric phenols, in particular bisphenols and novolaks, and have epoxide equivalent weights between 100 and 500, but in particular between 150 and 250 g/mol.

Polyhydric phenols which may be mentioned by way of example include resorcinol, hydroquinone, 2,2-bis(4-hydroxyphenyl)propane (bisphenol A), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxybiphenyl, 4,4'-dihydroxybenzophenone, bis(4-hydroxyphenyl)-1,1-ethane, bis(4-hydroxyphenyl)-1,1-isobutane, bis(4-hydroxy-tert-butyl-phenyl)-2,2-propane, bis(2-hydroxynaphthyl)methane, 1,5-dihydroxynaphthalene, tris(4-hydroxyphenyl)methane, bis(4-hydroxyphenyl) ether, bis(4-hydroxyphenyl) sulfone and the like and also the chlorination and bromination products of the above-mentioned compounds, such as, for example, tetrabromobisphenol A. Very particular preference is given to liquid diglycidyl ethers based on bisphenol A and bisphenol F having an epoxide equivalent weight of from 180 to 190 g/mol.

It is also possible to use polyglycidyl ethers (A 11) of polyalcohols, such as, for example, ethanediol 1,2-diglycidyl ether, propanediol 1,2-diglycidyl ether, propanediol 1,3-diglycidyl ether, butanediol diglycidyl ether, pentanediol diglycidyl ether (including neopentyl glycol diglycidyl ether), hexanediol diglycidyl ether, diethylene glycol diglycidyl ether, dipropylene glycol diglycidyl ether, higher polyoxyalkylene glycol diglycidyl ethers, for example higher polyoxyethylene glycol diglycidyl ethers and polyoxypropylene glycol diglycidyl ethers, mixed polyoxyethylene-propylene glycol diglycidyl ethers, polyoxytetramethylene glycol diglycidyl ethers, polyglycidyl ethers of glycerol, 1,2,6-hexanetriol, trimethylolpropane, trimethylolethane, pentaerythritol, sorbitol, polyglycidyl ethers of alkoxylated polyols (for example, glycerol, trimethylolpropane, pentaerythritol), diglycidyl ethers of cyclohexanedimethanol, bis(4-hydroxycyclohexyl)methane and 2,2-bis(4-hydroxycyclohexyl)propane, polyglycidyl ethers of castor oil, triglycidyltris(2-hydroxyethyl) isocyanurate. Very particular preference is given to using polyoxyalkylene glycol diglycidyl ethers, and among these polyoxypropylene glycol diglycidyl ethers having an epoxide equivalent weight of from 150 to 800, in particular from 300 to 400 g/mol.

In some cases, reactive monoepoxide diluents can be used in addition to the polyglycidyl ethers. The diluents may be added in desired amounts and are generally added in amounts of up to 30%, preferably 10–20%, based on the mass of the polyglycidyl ether. Examples of suitable compounds include methyl glycidyl ether, butyl glycidyl ether, allyl glycidyl ether, ethylhexyl glycidyl ether, long-chain aliphatic glycidyl ethers such as cetyl glycidyl ether and stearyl glycidyl ether, monoglycidyl ethers of a higher isomeric alcohol mixture, glycidyl ethers of a mixture of $C_{12}$- to $C_{13}$-alcohols, phenyl glycidyl ether, cresyl glycidyl ether, p-t-butylphenyl glycidyl ether, p-octylphenyl glycidyl ether, p-phenylphenyl glycidyl ether, glycidyl ethers of an alkoxylated lauryl alcohol and also monoepoxides such as epoxidized monounsaturated hydrocarbons (including butylene oxide, cyclohexene oxide, styrene oxide) and halogen-containing epoxides such as epichlorohydrin.

Further suitable compounds (A1) include poly(N-glycidyl) compounds which are obtainable by dehydrohalogenation of the reaction products of epichlorohydrin and amines such as aniline, n-butylamine, bis(4-amino-phenyl) methane, m-xylylenediamine or bis(4-methylamino-phenyl) methane. The poly(N-glycidyl) compounds also include, however, triglycidyl isocyanurate, triglydicylurazole and also their oligomers, N,N'-diglycidyl derivatives of cycloalkylene ureas and diglycidyl derivatives of hydantoins, and the like.

Furthermore, it is also possible to use as compounds (A1), polyglycidyl esters of polycarboxylic acids which are obtained by reaction of epichlorohydrin or similar epoxy compounds with an aliphatic, cycloaliphatic or aromatic polycarboxylic acid such as oxalic acid, succinic acid, adipic acid, glutaric acid, phthalic acid, terephthalic acid, tetrahydrophthalic acid, hexahydrophthalic acid, 2,6-naphthalenedicarboxylic acid and higher dicarboxylic diglycidyl esters such as, for example, dimerized or trimerized linolenic acid. Examples include diglycidyl adipate, diglycidyl phthalate and diglycidyl hexahydrophthalate. Further compounds which may be mentioned are glycidyl ester of unsaturated carboxylic acids and epoxidized esters of unsaturated alcohols or unsaturated carboxylic acids.

A comprehensive listing of suitable epoxide compounds for use as (A1) is given in the handbook "Epoxidverbindungen und Epoxidharze" by A. M. Paquin, Springer Verlag, Berlin 1958, chapter IV, and in Lee Neville "Handbook of Epoxy Resins", 1967, chapter 2, which is hereby incorporated by reference.

It is also possible to use mixtures of a plurality of epoxy resins as (A1).

Amines (A21) which can be used for preparing the 1,2-epoxide compounds of the invention include all meeting the above formula and, are, for example, t-butylamine (2-methyl-2-aminopropane), 2-methyl-2-butylamine, t-alkylamines from the Rohm and Haas Company such as Primene® TOA (t-octylamine=1,1,3,3-tetramethyl-butylamine), Primene® 81 R (t-alkylamines C12–C14), Primene® JM-T (t-alkylamine C16–C22), 2-amino-2-methyl-1-propanol, 2-amino-2-ethyl-1,3-propanediol, tris (hydroxymethyl)aminomethane, isopropylamine (2-propanamine), sec-butylamine (2-aminobutane), 2-amino-1-butanol, 3-methyl-2-butylamine, 2-pentylamine, 3-pentyl-amine, cyclopentylamine, 4-methyl-2-pentylamine, cyclohexylamine, 2-heptylamine, 3-heptylamine, 2-methylcyclohexylamine, 3-amino-2,4-dimethylpentane, 6-methyl-2-aminoheptane, 1-phenylethylamine, 1-methyl-3-phenylpropylamine, cyclododecylamine, particular preference being given to 2-aminobutane and cyclohexylamine.

Further suitable amines include isobutylamine (2-methyl-1-propanamine), 2-methylbutylamine (1-amino-2-methylbutane), isoamylamine (isopentylamine=1-amino-3-methylbutane), furfurylamine, benzylamine, 4-methoxybenzylamine, 2-ethylhexylamine, isononylamine (mixture of isomeric nonylamines containing about 90% of 3,5,5-tri-methylhexylamine), and the like, particular preference being given to 2-ethylhexylamine.

Preferred amines (A21) are t-alkylamines having from 9 to 22, in particular from 12 to 14, carbon atoms.

Secondary amines (A22) used include any within the above formula, and are preferably secondary polyetherdiamines, particular preference being given to the disecondary amines. Products of this type are sold by Condea Chemie GmbH under the name Novamin®. Suitable products are, inter alia, the secondary polyetheramines Novamine® N 10 (average molecular weight in g/mol 390), N 20 (560), N 40 (2150) and N 50 (4150), particular preference being given to the secondary polyether diamines Novamin® N 20 and Novamin® N 40.

Suitable diprimary diamines (A23) include any within the above formula, and are generally the aliphatic branched diamines having from 5 to 20 carbon atoms, such as, for example, neopentanediamine (1,3-diamino-2,2-dimethylpropane), 1,2-diamino-2-methylpropane, 1,2- and 1,4-diaminocyclohexane, m-xylylenediamine, 1,3-bis (amino-methyl)cyclohexane, 1-amino-2-aminomethyl-3,3, 5-trimethylcyclopentane and its 3,5,5-isomer, triacetonediamine, 1,8-diamino-p-menthane, isophoronediamine (3-aminomethyl-3,5,5-trimethylcyclohexylamine), 4,4'-diaminodiclycohexylmethane, 3,31-dimethyl-4,4'-diaminodiclycohexylmethane, 3,8-bis(aminomethyl)tricyclo[$5.2.1.0^{2,6}$] decane and its 4,9-isomer.

It is also possible to use as amines (A2) any combination or mixtures of the amines (A21), (A22), and (A23).

The epoxide compounds (A) of the invention are prepared by reacting the epoxides (A1) with the amines (A2), generally while stirring and generally while heating until the theoretically calculated epoxide equivalent weight has been reached, i.e., until all active hydrogens of the amine have reacted with the epoxide groups present in excess. The reaction temperatures may be appropriately selected to facilitate the reaction, and are generally maintained at from 25 to 200° C., preferably at from 50 to 150° C., in particular at from 60 to 130° C. Depending on temperature and epoxides and amines used, the reaction times are generally between a few minutes and a number of hours.

In most cases, no additional catalysts are necessary for the quantitative reaction of the amines with the epoxides. It is advantageous, in particular in the case of low-boiling amines, to carry out the reaction at superatmospheric pressure, e.g., up to 5 bar.

In the preparation of the epoxide compounds of the invention (A), it is also possible to use various epoxides (A1) as a mixture and react them directly with the amines (A2). However, it is also possible to carry out a targeted, stepwise build-up using various epoxides in succession, by first reacting an epoxide I (A1) with an excess of the amines, e.g., 2 active amine hydrogens per epoxide equivalent, and after complete reaction of the epoxide groups of the epoxide I, reacting a further epoxide II (A1) in excess with the active amine hydrogens still available.

In an analogous way, various amines (A2) can also be used either as a mixture or in a stepwise build up. In the respective intermediate stages containing an excess of amine, it is possible to remove residual free amine by distillation, if desired under reduced pressure. It is also possible to prepare any mixtures of the epoxides of the invention, e.g., to achieve certain processing viscosities and properties of the cured systems.

The epoxide compounds (B) which are optionally used, are, like the compounds (A1), selected from any known polyepoxides having at least two epoxide groups per molecule such as those described above in connection with (A1). If desired, they can also be used in admixture with monoepoxides. They are generally different from the compounds used as (A1). However, the compounds (B) also include unreacted amounts of the epoxide compounds (A1) from the preparation of the epoxy resins (A).

Particular preference is given to a composition of (A1) polyoxypropylene glycol diglycidyl ether, (A2) 2-aminobutane and (B) diglycidyl ether of bisphenol A or bisphenol F.

The component (C) used for a two-component process can be any known amine hardener for 1,2-epoxides. Mixtures of hardeners are also useful. Examples which may be mentioned include aliphatic amines such as polyalkylenepolyamines, diethylenetriamine and triethylenetetramine, tetraethylenepentamine, pentaethylenehexamine, 2,2,4- and/or 2,4,4-trimethylhexamethylenediamine, bis(3-aminopropyl)methylamine, 1,4-bis(3-aminopropyl)piperazine, N,N-bis(3-amino-propyl) ethylenediamine, 2-methylpentanediamine (Dytek® A), oxyalkylenepolyamines such as polyoxypropylenedi- and triamines and 1,13-diamino-4,7,10-trioxatridecane, cycloaliphatic amines such as isophoronediamine (3,5,5-trimethyl-3-aminomethylcyclo-hexylamine), 4,4'-diaminodicylcohexylmethane, 3,3'-dimethyl-4,4'-diaminodicyclomethane, N-cyclohexyl-1,3-propanediamine, diaminocyclohexanes, in particular 1,2-diaminocyclohexane, 1,4-diamino-3,6-diethylcyclohexane, 1,2-diamino-4-ethylcyclohexane, 1-cyclohexyl-3,4-diaminocyclohexane, 2,2-bis(4-aminocyclohexyl)propane, 1,3- and 1,4-bis(aminomethyl)cyclohexane, piperazine, N-aminoethylpiperazine, TCD-diamine (3(4), 8(9) -bis (aminomethyl) tricyclo[5.2.1.0$^{2.6}$]decane), araliphatic amines such as xylylenediamines (m- and p-xylylenediamine), aromatic amines such as phenylenediamines, 4,4'-oxydianiline and 4,4'-diaminodiphenylmethane.

Further suitable hardeners include adduct hardeners, which are reaction products of epoxide compounds, in particular glycidyl ethers of bisphenol A and F, with excess amines, for example, reaction products of ethylenediamine, 2,2,4-, 2,4,4-trimethylhexamethylenediamine, isophoronediamine, 1,2-diaminocyclohexane, m-xylylenediamine and/or bis (aminomethyl) cyclohexane with terminal epoxides such as, for example, propylene oxide, hexene oxide or with glycidyl ethers such as phenyl glycidyl ether, ethylhexyl glycidyl ether, butyl glycidyl ether or with glycidyl esters such as Cardura® E, or polyglycidyl ethers or esters as described for (A1). Polyamidoamine and polyimidazoline hardeners which can be used for the present purposes are generally prepared by condensation of polyamines and polycarboxylic acids, if desired with the addition of monocarboxylic acids, in particular by condensation of polyalkylenepolyamines with polymeric fatty acids obtained by catalytic polymerization of monounsaturated or polyunsaturated fatty acids or by copolymerization of polymerizable compounds such as, for example, styrene.

Mannich bases are suitable as hardeners and are generally prepared by condensation of polyamines, preferably diethylenetriamine, triethylenetetramine, isophoronediamine, 2,2,4- or 2,4,4-trimethylhexamethylenediamine, 1,3- and 1,4-bis(aminomethyl) cyclohexane, in particular m- and p-xylylenediamines, with aldehydes, preferably formaldehyde and monohydric or polyhydric phenols having at least one aldehydically reactive position on the ring, e.g., the various cresols and xylenols, p-tert-butylphenol, resorcinol, 4,4'-dihydroxydiphenylmethane, 4,4'-dihydroxydiphenyl-2,2-propane but preferably phenol.

Particularly preferred hardeners for the two-component method are hardeners based on TCD-diamine, Mannich bases, for example based on phenol and/or resorcinol, formaldehyde and m-xylylenediamine, and also N-aminoethylpiperazine and mixtures of N-aminoethyl-piperazine with nonylphenol and/or benzyl alcohol.

The use of single-component systems is frequently desired, since the processor does not have to carry out mixing of the individual components directly prior to use of the system, e.g., as adhesive. Single-component systems are obtained by mixing the epoxide component (A) and, if desired, (B) with latent hardeners. Such mixtures generally have a storage life of a number of weeks or months at room temperature, i.e., the viscosity remains constant over this period of time or rises only slightly. Any known latent hardener can be used. One of the widely used latent hardeners is dicyandiamide. Dicyandiamide (Cyanoguanidine, Dyhard® 100 from SKW) is itself not a hardener at room temperature. It decomposes at elevated temperatures and effects curing of the epoxide system via reactive decomposition products. Flexible single-component epoxy resin systems are prepared by dispersing the latent hardener, for example the dicyandiamide, as component (C) in the flexibilized epoxy resin component (A), if desired together with additives (D) such as, for example, a thixotrope. Further suitable latent hardeners include, for example, aromatic amines such as, for example, 4,4'- or 3,3'-diaminodiphenyl sulfone, guanidines such as, for example, 1-o-tolylbiguanide, modified polyamines such as, for example, Anchor® 2014 S (Anchor Chemical UK Limited, Manchester), carboxylic acid hydrazides such as, for example, adipic acid dihydrazide, isophthalic acid dihydrazide or anthranilic acid hydrazide, triazine derivatives such as, for example, 2-phenyl-4,6-diamino-s-triazine (benzoguanamine) and melamine.

The hardeners (C) are used in amounts effective to give the desired hardening and generally used in amounts of from 0.01 to 50%, preferably from 1 to 40%, based on the mass of the component (A). Curing with dicyandiamide is generally carried out using amounts of from 0.01 to 20%, preferably from 0.5 to 15%, based on the mass of the component (A). If desired, an accelerator can be added in an amount of from 0.01 to 10%, preferably at from 0.1 to 7%, based on the mass of the component (A) (cf. additives (D), can be accelerators).

During the incorporation of the hardeners (C) and the addition of any accelerators (cf. additives (D), accelerators), the temperature should be below the reaction temperature of the respective resin-hardener system. It can here become necessary to cool the reaction mixture during the dispersion process.

Using the polyamine hardeners specified for the two-component process, it is possible in principle to carry out curing at room temperature. However, these relatively low temperatures frequently do not give optimum properties of the cured system. For the single-component system used with latent hardeners such as, for example, dicyandiamide, an elevated temperature is required to initiate the crosslinking reaction. The curing temperature of the composition of the invention is generally from 5 to 260° C., preferably from 120 to 200° C. The curing time at temperatures of from 120 to 200° C. is generally from 10 to 200 minutes.

If the solid epoxides (A) of the invention are used as powder resin components, particularly suitable hardeners (C) are polyesters containing carboxyl groups. Any such polyester can be used. The carboxyl polyesters usually have an acid number of from 15 to 150 mg KOH/g, preferably from 30 to 100 mg KOH/g, and a glass transition temperature of at least 35° C., preferably at least from 40 to 60° C.

The molecular weight $M_n$ (number average; determined by gel permeation chromatography, polystyrene standard) of the polyester is generally between 600 and 12000, preferably between 2000 and 8000 g/mol. The carboxyl groups are preferably at the ends of the molecule chains which may be linear or branched. In general, the end groups are over 70%, preferably over 90%, carboxyl groups, with the chain ends predominantly having on average 2 or more carboxyl groups, partially present as carboxylic acid anhydride groups.

The preparation of the polyesters containing carboxyl groups is carried out in a known manner in a single-stage process or preferably in a two-stage process as described, for example, in DE-A 21 63 962, which is herein incorporated by reference, by reaction of suitable polyols with suitable polycarboxylic acids or their derivatives, in particular anhydrides. The acid component is used in excess. In general, the ratio of polyol and acid components is such that the equivalent ratio of hydroxyl to acid or anhydride groups is from 1:3 to 1:1.1, preferably from 1:2.2 to 1:1.8.

Suitable compounds containing hydroxyl groups are, for example: OH-containing polyesters, polyethers, polythioethers, polyacetals, polycarbonates and polyesteramides. The polyesters, which may be linear or branched, are preferred.

Polyhydric alcohols which may be used include, for example, ethylene glycol, propylene glycol-(1,2) and -(1,3), butylene glycol-(1,4) and -(2,3), 1,6-hexanediol, 1,8-octanediol, neopentyl glycol, 1,4-bishydroxymethyl-cyclohexane, 2-methyl-1,3-propanediol, glycerol, trimethylolpropane, 1,2,6-hexanetriol, 1,2,4-butanetriol, trimethylolethane, pentaerythritol, diethylene glycol, triethylene glycol, tetraethylene glycol and higher polyethylene glycols, dipropylene glycol and higher polypropylene glycols and also dibutylene glycol and higher polybutylene glycols. Polyesters from lactones, e.g., caprolactone, or from hydroxycarboxylic acids, e.c., ω-hydroxycaproic acid, can also be used. The polycarboxylic acids can be aliphatic, cycloaliphatic, aromatic and/or heterocyclic in nature and can, if desired, be substituted, e.g., by halogen atoms, and/or be unsaturated.

Examples which may be mentioned of such carboxylic acids and their derivatives useful in preparing the polyester include succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimerized and trimerized unsaturated fatty acids, if desired in admixture with monomeric unsaturated fatty acids such as oleic acid, dimethyl terephthalate and bisglycol esters of terephthalic acid, in particular trimellitic anhydride (TMSA) and pyromellitic anhydride or maleic anhydride adducts. The polyesters containing carboxyl groups as hardeners (C) and epoxide compounds (A) are generally present in the mixture of the invention in amounts such that the equivalent ratio of carboxyl groups in (C) to epoxide and hydroxyl groups in (A) and, if applicable, (B) is from 0.7 to 1.3, preferably from 0.9 to 1.1. For this purpose, the amount of component (C) is usually from 50 to 90%, preferably from 65 to 85%, based on the sum of the masses of (A), (B) and (C). In this way, a sufficient crosslinking density is generally obtained.

Suitable hardeners (C) for powder resins of the invention also include all those compounds known for this purpose, in particular anhydride hardeners such as, for example: phthalic anhydride, tetrahydrophthalic anhydride, 4-methyltetrahydrophthalic anhydride, hexahydrophthalic anhydride, 4-methylhexahydrophthalic anhydride, nadicmethyl anhydride (trivial name for isomers of methylendomethylenetetrahydrophthalic anhydride), chlorendic(HET) anhydride (3,4,5,6,7,7-hexachloro-3,6-endomethylenetetrahydrophthalic anhydride), pyromellitic dianhydride, benzophenonetetracarboxylic dianhydride, trimellitic anhydride, hardeners corresponding to the component (B) from DE 2 556 182 (which is herein incorporated by reference), dodecenylsuccinic anhydride, isooctenylsuccinic anhydride, etc., dicyandiamide which is produced, for example, under the trade name Dyhard® from SKW Trosberg, phenolic hardeners such as, for example, see Dow® hardeners D.E.H. 80, D.E.H. 82, D.E.H. 84, carboxylic acid salts of imidazole or imidazoline compounds, fusible, soluble adducts which are obtained by reaction of an epoxide compound with imidazole or imidazoline compounds or their carboxylic acid salts.

Preferred hardeners include imidazolines or imidazoles, in particular those of the formula (III)

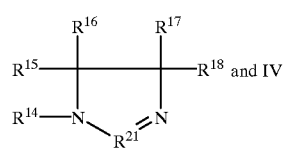 and IV

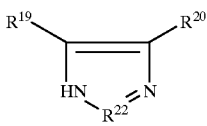

where $R_{14}$ to $R_{20}$ are, independently of one another, hydrogen or an alkyl, aryl, aralkyl, cycloalkyl or heterocyclic radical, $R_{21}$ and $R_{22}$ are the same as $R_{14}$ to $R_{20}$ or are an alkylene or arylene radical which can be unsubstituted or substituted by one or more alkyl, aryl, aralkyl, cycloalkyl or heterocyclic radicals and where a plurality of radicals can, if desired, also be bonded via heteroatoms.

In detail, suitable imidazolines are, for example, the following compounds: 2-methylimidazoline, 2-ethyl-4-methylimidazoline, 2-phenylimidazoline, 2-undecylimidazoline, 2-heptadecylimidazoline, 2-ethylimidazoline, 2-isopropylimidazoline, 2,4-dimethylimidazoline, 2-phenyl-4-methylimidazoline, 2-benzylimidazoline, 2-(o-tolyl)imidazoline, 2-(p-tolyl)imidazoline, tetramethylenebisimidazoline,1,1,3-trimethyl-1,4-tetramethylenebisimidazoline,1,3,3-trimethyl-1,4-tetramethylenebisimidazoline, 1,1,3-trimethyl-1,4-tetramethylenebis-4-methylimidazoline, 1,2-phenylenebisimidazoline, 1,3-phenylenebisimidazoline, 1,4-phenylenebisimidazoline, 1,4-phenylenebis-4-methylimidazoline. It is also possible to use any mixtures of the imidazolines. Particular preference is given to 2-phenylimidazoline.

Suitable imidazoles are imidazole itself, 1-methylimidazole, 2-methylimidazole, 4-methylimidazole, 5-methylimidazole, 1-ethylimidazole, 2-ethylimidazole, 1-propylimidazole, 2-propylimidazole, 2-isopropylimidazole, 1-butylimidazole, 2-octylimidazole, 2-undecylimidazole, 2-heptadecylimidazole, 2-cyclohexylimidazole, 1-phenylimidazole, 2-phenylimidazole, 2,4-dimethyl-imidazole, 1,2-dimethylimidazole, 4,5-dimethylimidazole, 2-ethyl-4-methylimidazole, 1-ethyl-2-methylimidazole, 1-methyl-2-isopropylimidazole, 4-butyl-5-ethylimidazole, 2-cyclohexyl-4-methylimidazole, 1-benzyl-2-methylimidazole, 2-phenyl-4-methylimidazole, 4,5-diphenylimidazole, 2-ethyl-4-phenylimidazole, 2,4,5-trimethylimidazole, 2,4,5-tricyclohexylimidazole, 1,2,4,5-tetramethylimidazole and also benzimidazoles and their derivatives. It is also possible to use any mixtures of the imidazoles with one another or with imidazolines.

The amount of hardener in the pulverulent mixtures of the invention depends on the type of hardener and can vary within wide limits. In general, the amount of hardener is from 0.01 to 60% by weight, preferably from 0.5 to 40% by weight, based on the sum of components (A), (B) and (C).

The composition of the invention can contain, besides the components (A), (B) and (C), further customary additives (D) such as, for example, accelerators or curing catalysts, further hardeners and additional curable resins or extender resins and also the customary paint additives such as pigments, pigment pastes, dyes, antioxidants, stabilizers, levelling or thickening agents (thixotropes), antifoaming agents and/or wetting agents, reactive diluents, fillers, plasticizers, flame inhibitors and the like. These additives can be added to the curable mixtures either a relatively long time beforehand or only directly prior to processing. Any desired additive can be used, and they are used in an amount effective to achieve the desired purpose.

Accelerators which can be used, in particular for curing by the two-component process using amine hardeners, include, for example, phenols and alkylphenols having 1-12 carbon atoms in the alkyl group, cresols, the various xylenols, nonylphenol, polyphenols such as bisphenol A and F, OH-containing aromatic carboxylic acids such as salicylic acid, m-hydroxybenzoic acid, p-hydroxybenzoic acid and tertiary amines such as benzyl-dimethylamine, 1,3,5-tris (dimethylamino) phenol, mixtures of N-aminoethylpiperazine and alkanolamines (cf. DE-A 29 41 727), Accelerator 399®(Texaco Chemical Company) and the like.

It is frequently also necessary to accelerate the curing in the single-component process using latent hardeners such as, for example, dicyandiamide. Suitable accelerators which may be mentioned, inter alia, include tertiary amines such as, for example, benzyldimethylamine, 1,4-diazabicyclo [2.2.2]octane (Dabco), N,N-dimethylethanolamine, 2,2-dimethylpyridine, 4-dimethylaminopyridine, substituted ureas such as, for example, N,N-dimethyl-N'-(3-choro-4-methylphenyl)urea (Chlortoluron), N,N-dimethyl-N'-(4-chlorophenyl) urea (Monuron) or N,N-dimethyl-N'-(3,4-dichlorophenyl)urea (Diuron), 2,4-bis(N',N'-dimethylureido)toluene or 1,4-bis(N',N'-dimethylureido) benzene, $BF_3$-amino complexes, quaternary ammonium compounds such as, for example, benzyltrimethylammonium chloride, tetramethylammonium chloride, tetraethylammonium chloride, benzyldodecyldiethylammonium chloride, mercaptans such as, for example, triglycol dimercaptan or 1,2-bis(2'-mercaptoethoxy)ethane, the polymeric polysulfides of the formula

known under the name Thiokol®, trimethylolpropane trithioglycolate, dipentaerythritol hexa(3-mercaptopropionate) or trithiols such as, for example, 2,4,6-s-triazinetrithiol, polyoxyalkylenedithiols or polyoxyalkylenetrithiols and also the polyoxyalkylene derivatives sold under the name Cap Cure® (Henkel Napco AG) such as, for example, Cap Cure® WR 6 or WR 36 and Cap Cure® 3-800 and, in particular, imidazolines and imidazoles.

In detail, suitable imidazolines or imidazoles are, for example, the compounds mentioned for the hardeners for powder resins.

Suitable catalysts for an accelerated reaction between the carboxyl groups of a hardener component (C) and the epoxide groups of the components (A) and (B) include, for example, zinc naphthenate and octoate, tin octoate, dibutyltin dilaurate, lithium benzoate and hydroxide, tin and zinc chloride, titanium, vanadium and zirconium alkoxides, metal salts of organic carboxylic acids, quaternary ammonium and phosphonium salts, salts of phosphoric acid, amines and amidines, phosphines, substituted and unsubstituted ureas and polyureas, pyrazolones, pyrimidines, imidazole and their derivatives. The amount of such catalysts is usually from 0.05 to 5%, preferably from 0.1 to 2%, based on the mass of the carboxyl hardener component (C).

Additionally curable resins as component (D) are, for example, hydrocarbon resins, phenoxy resins, phenolic resins, polyurethane resins, polysulfides (Thiokol®), reactive, liquid polymers of butadiene or corresponding acrylonitrile/butadiene copolymers (Hycar® grades), while customary extender resins which may be mentioned here are, inter alia, non reactive epoxy resin modifiers, pine oil, tars, phthalic esters and coumarone oils.

Leveling agents which can be used include, for example, acetals such as polyvinyl formal, polyvinyl acetal, polyvinyl butyral, polyvinyl acetobutyral, and the like, polyethylene and polypropylene glycols, silicone resins, mixtures of zinc soaps, of fatty acids and aromatic carboxylic acids, in particular commercial products based on polyacrylates. The leveling agents can be added to the component (A) in amounts of 0.1–4%, preferably 0.2–2.0%, based on the total mass.

Coupling agents and hydrophobicizing agents which can be used are, inter alia, silanes. These can react both with the inorganic substrate and with the organic polymer adhesive, coating composition, or the like, to form strong bonds. The improvement in adhesion enables the mechanical parameters, in particular after the action of moisture, to be improved. Appropriate products are offered, for example, under the name Dynasylan® from Hüls Aktiengesellschaft, Marl or as Silan® by Degussa AG. Stabilizers are, for example, aromatic diketones such as benzoin which suppress certain decompositions and thus reduce pore formation. These are generally used in amounts from 0.1 to 3%, preferably from 0.2 to 2%, based on the mass of the total binder (components (A), (B) and (C)).

The dyes and pigments can be either inorganic or organic in nature. Examples which may be mentioned include titanium dioxide, zinc oxide, carbon black, conductivity black such as, for example, Printex® XE 2 from Degussa AG. The organic dyes and pigments are to be selected so as to be stable at the curing temperatures and not to lead to any unacceptable shifts in shade of color.

Suitable fillers include, for example, quartz flour, silicates, chalk, gypsum, kaolin, mica, barite, organic fillers such as, for example, polyamide powder, organic and inorganic fibers and the like. Thixotropes and thickeners which can be used include, for example, Aerosil® (finely divided silicon dioxide, for example the grades 150, 200, R 202, R 805 from Degussa), bentonite grades (e.g., Sylodex® 24 from Grace, Bentone®, NL Chemicals).

To prepare the curable mixtures of the invention, the components (A) and, if desired, (B) and (C) and also, if desired, additionally ID) are mixed by means of any suitable machines and/or rollers. In the case of components having a low viscosity, this can be carried out in bulk. The incorporation of the additives and fillers is generally carried out using forcing mixers such as, for example, dissolvers and compounders, double-Z mixers and extruders. Here too, it can be necessary to avoid premature reaction of the components by cooling the formulated resin/hardener system of the invention.

The curable mixtures of the invention can be used in a variety of ways, for example, as constituent of surface coatings for coating a wide variety of organic and inorganic substrates such as metals, concrete, fibrocement, glass, ceramic, rubber, leather, wood, textiles, plastics, also for the preparation of thick-layer floor coatings and intermediate coatings. In particular, the mixtures of the invention are suitable for coatings, adhesives, putties, sealing compositions and shaped parts in many fields of application where good adhesion, high impact and shock strength and improved flexibility and elasticity are required, such as, for example, in the building sector for crack-bridging coatings and filling of joints and also as additive to polymer cements. The compositions of the invention are particularly suitable as single-component adhesives and for powder coatings.

The mixtures can be applied by customary methods, such as painting, spraying, doctor-blade application, dipping, casting, rolling on, application as a bead of adhesive from suitable machines, by electrostatic powder spraying, fluidized-bed sintering, electrostatic fluidized-bed sintering, flame spray processes and the like. The coatings are then usually cured at room temperature or, if desired, at elevated temperatures.

The invention is illustrated by reference to the following, non-limiting, examples.

EXAMPLES

Epoxy Resins I

Example 1

110 g of 2-aminobutane are added under nitrogen to 2040 g of Beckopox® EP 075 (polyoxypropylene glycol diglycidyl ether, Hoechst) having an epoxide equivalent (EV) of 340 g/mol in a four-necked flask fitted with stirrer, thermometer and condenser. The reaction mixture is heated to 60° C. and held at this temperature for 2 hours, it is then slowly heated to 120° C. over a period of 2 hours and held at this temperature for 4 hours until the epoxide equivalent has reached a value of 737 g/mol. The reaction product is immediately cooled to room temperature. The viscosity at 25° C. is 440 mPa.s and the amine number is 42.9 mg KOH/g. This example was repeated twice to yield resins with epoxide equivalents of 707 g/mol (1') and 688 g/mol (1").

Example 2

2040 g of Beckopox® EP 075 are reacted with 146 g of 2-aminobutane in a similar manner to Example 1. The reaction product has an EV of 1111 g/mol, a viscosity at 25° C. of 1200 mpa.s and an amine number of 54.5 mg KOH/g.

Example 3

1360 g of Beckopox® EP 075 are reacted with 110 g of 2-aminobutane in a similar manner to Example 1. The reaction product has an EV of 1396 g/mol, a viscosity at 25° C. of 1860 mPa.s and an amine number of 59.8 mg KOH/g. This example was repeated to yield a resin with an epoxide equivalent of 1326 g/mol (3').

Example 4

54 g of benzylamine are added under nitrogen to 680 g of Beckopox® EP 075 (cf. Example 1) in a four-necked flask fitted with stirrer, thermometer and condenser. The reaction mixture is heated to 120° C. and held at this temperature. After 2.5 hours, the EV is 726 g/mol. The mixture is immediately cooled to room temperature. The viscosity at 25° C. is 540 mpa.s and the amine number is 40.7 mg KOH/g.

Example 5

426 g of Grilonit® RV 1812 (hexanediol diglycidyl ether, EMS-Chemie AG) having an EV of 142 g/mol are placed in a four-necked flask fitted with stirrer, thermometer and condenser, heated to 60° C. and, under nitrogen, 73 g of 2-aminobutane are added dropwise over a period of 35 minutes. During the addition, there takes place an exothermic reaction which from 75° C. is cooled using a water bath. After the exothermic reaction has subsided, the temperature is held at 70° C. for 4 hours. The EV is now 473 g/mol. The reaction product is cooled to room temperature and a viscosity at 25° C. of 2980 mPa.s and an amine number of 102 mg KOH/g are measured.

Example 6 a) 86 g of 2-aminobutane are added to 340 g of Beckopox® EP 075 (cf. Example 1) in a four-necked flask fitted with stirrer, thermometer and condenser with receiver and the mixture is slowly heated to 100° C. over a period of 2 hours. After a hold time of 3 hours at this temperature, the epoxide groups are completely reacted. Vacuum is then applied and the excess 2-aminobutane is taken off over a period of 1 hour at 100° C. and 30 mbar. This gives 403 g of reaction product having an amine number of 123 mg KOH/g and a viscosity of 25° C. of 930 mpa.s. The hydrogen active equivalent (molecular weight based on the number of active hydrogen atoms) is calculated as 558 g/mol.

b) 389 g of the epoxide amine adduct from Example 6a) and 255 g of Beckopox® EP 140 (EV 183 g/mol) are reacted under nitrogen for 6 hours at 90° C. in an apparatus as in Example 1. The reaction product has an epoxide equivalent of 911 g/mol, an amine number of 73.4 mg KOH/g and the viscosity at 25° C. is 1895 mpa.s, measured in an 80% strength solution in methoxypropanol.

Example 7 a) 453 g of Beckopox® EP 075 (cf. Example 1) and 73 g of 2-aminobutane are held at 60° C. for 1 hour in a four-necked flask fitted with stirrer, thermometer and condenser with receiver and are then heated to 100° C. over a period of 2 hours. After a hold time of 2.5 hours at from 100 to 120° C. a vacuum of 34 mbar is applied for 20 minutes and the mixture is cooled to room temperature. This gives 520 g of reaction product having an amine number of 103 mg KOH/g and a viscosity of 25° C. of 2250 mpa.s. The hydrogen active equivalent is calculated as 1040 g/mol.

b) 502 g of the epoxide amine adduct from Example 7a) and 225 g of Beckopox® EP 140 (EV 183) are reacted under nitrogen for 6 hours at 90° C. in an apparatus as in Example 1. The reaction product has an epoxide equivalent of 982 g/mol, an amine number of 71 mg KOH/g and the viscosity at 25° C. is 1177 mpa.s (80% strength in methoxypropanol).

Example 8

973 g of Beckopox® EP 140 having an EV of 183 g/mol and 905 g of Novamin® N 40 (secondary polyetherdiamine from Condea) having a mean molecular weight of 2150 g/mol are heated under nitrogen to 140° C. in a four-necked flask fitted with stirrer, thermometer and condenser, held at this temperature for 8 hours and then cooled. The reaction product hag an EV of 420 q/mol, an amine number of 26.4 mg KOH/g and a viscosity at 25° C. of 11850 mPa.s.

Example 9

1099 g of Beckopox® EP 140 and 901 g of Novamin® N 20 (secondary polyetherdiamine from Condea) having a mean molecular weight of 560 g/mol are reacted in a similar manner to Example 8. The reaction product has an EV of 668 g/mol, an amine number of 83.3 mg KOH/g and a viscosity at 25° C. of 2320 mpa.s (80% strength in methoxypropanol).

Example 10 a) 340 g of Beckopox® 075 having an EV of 340 g/mol and 600 g of Novamin® N 20 (secondary polyetherdiamine from Condea) having a mean molecular weight of 560 g/mol are heated under nitrogen to 150° C. in a four-neck flask fitted with stirrer, thermometer and condenser, held at this temperature for 20 hours and then cooled. The reaction product has an amine number of 116.5 mg KOH/g, a viscosity at 25° C. of 748 mPa.s and an epoxide number of <0.1. The hydrogen active equivalent is calculated as 825 g/mol.

b) 353 g of the epoxide-amine adduct from Example 10a) and 183 g of Beckopox® EP 140 (EV 183 g/mol) are reacted under nitrogen for 16 hours at 120° C. in an apparatus as in Example 1. The reaction product has an epoxide equivalent of 860 g/mol, an amine number of 77 mg KOH/g and the viscosity at 25° C. is 80250 mPa.s.

Example 11

194 g of Primene® 81 R (t-alkylamines having radicals in the range from C12 to C14 from Rohm & Haas Company; molecular weight 194) are added under nitrogen to 1360 g of Beckopox® EP 075 (cf. Example 1) having an epoxide equivalent of 340 in a four-necked flask fitted with stirrer, thermometer and condenser. The reaction mixture is heated to 150° C. and held at this temperature for a total of 14 hours until the epoxide equivalent has reached a value of 651. The viscosity at 25° C. is 249 mPa.s and the amine number is 40.8 mg KOH/g.

Elastic Coatings II 100 g of the amino-modified epoxy resins or epoxy resin mixtures of the invention are mixed with the approximately equivalent (corresponding to the HAV) amount of hardener and a 1.5 mm thick layer of this mixture is applied to a polypropylene plate by means of an Erichsen frame, (a) cured for 7 days at room temperature, (b) further heat treated for 5 hours at 60° C. and (c) removed from the polypropylene and stored for 24 hours at –20° C. To assess the low-temperature elasticity, the cold sample at –20° C. is bent in the middle by 180° C.

The individual examples and the test results are summarized in Table 3.

Assessment of the Storage Stability III

Table 1 shows the epoxide equivalents (EV), determined in accordance with DIN 53 188, and viscosities, determined in accordance with DIN 53 177, after storage at 50° C. for 6 and 12 weeks of epoxy resins according to the invention. With one exception, the rise in the measured value after 12 weeks compared with the value on preparation is below 10% for the epoxide equivalents and below 25%, usually significantly below 20%, for the viscosities.

It is generally known that tertiary amines catalyze the self-polymerization of the epoxide groups and thus crosslink the epoxy resin. It is therefore surprising that the epoxides of the invention, even at 50° C., do not gel and show only a limited rise in the measured parameters.

Epoxy resins of the present invention can thus be stored without problems, for example for 3 months, at room temperature and sometimes at higher temperatures, e.g., 40° C., until use. This is confirmed by the experimental results of Table 2. Over a period of three months, the EVs remain almost constant and the viscosity rises by an amount which corresponds approximately to the error of the measurement method.

Mechanical Parameters of the Shaped Bodies Made of Various Resin/hardener Combinations The amino-modified epoxy resins or epoxy resin mixtures of the invention and the epoxy resins for comparison are mixed in the weight ratios shown in Table 4 and cast into pressing molds of steel. curing is carried out for 7 days at room temperature. The 4 mm thick sheets obtained in this manner are further heat treated for 5 hours at 60° C.

The test specimens required for the mechanical tests are, depending on hardness, cut from the sheets by stamping or by machining and are subsequently stored for 48 hours in a standard environment 23/50-2 in accordance with DIN 50 014 until commencement of the test.

Tensile tests are carried out in accordance with DIN 53 455 in a standard environment 23/50-2 DIN 50 014, at 0° C. and at −20° C. In each case, 6 test specimens No. 3 in accordance with DIN 53 455 were used. The test specimens for carrying out the test at 0° C. and at −20° C. were stored at this temperature for 4 hours prior to the commencement of the test. The test speed was 1 and 50 mm/min respectively at 0° C. and at −20° C. and 5 mm/min at 23° C.

The elongations were measured by means of an inductive measurement system. The tensile strength $\sigma_B$ and the elongation at break $\epsilon_R$ were determined. The modulus of elasticity $E_0$ was determined between 0.05 and 0.25% elongation.

The measurement results (arithmetic mean) are shown in Table 4.

Using the resin/hardener systems of the invention, it is possible, depending on composition and desired application, to obtain viscoelastic to flexible coatings. In particular, excellent low-temperature elastic compositions can be prepared.

The excellent elasticity of the cured systems is also evidenced by the high elongation at break values found at temperatures of from 23 to −20° C. (Table 4).

A further advantage is the low viscosity of the elastic epoxy resins A in comparison with the known resins of the prior art (cf. Tables 1 and 2).

Other embodiments of the invention will be apparent to those skilled in the art from consideration of the specification and practice of the invention disclosed herein. It is intended that the specification be considered as exemplary only, with the true scope and spirit of the invention being indicated by the following claims.

TABLE 1

Storage stabilities of amine-modified epoxy resins at 50° C.

| Example | | Initial values | | Change (storage at 50° C.) | | | | | |
| | | | | after 6 weeks | | | after 12 weeks | | |
| III | Reaction product of epoxy resin and amine | EV | visc. 25° C. | EV | % | visc. 25° C. | % | EV | % | visc. 25° C. | % |
|---|---|---|---|---|---|---|---|---|---|---|---|
| 1 | Example I.1' | 707 | 426 | 722 | 2.1 | 454 | 6.6 | 751 | 6.2 | 483 | 13.4 |
| 2 | Example I.3' | 1326 | 1742 | 1382 | 4.2 | 1838 | 5.5 | 1454 | 9.7 | 1964 | 12.7 |
| 3 | Example I.4 | 726 | 544 | 745 | 2.6 | 628 | 15.4 | 806 | 11.0 | 682 | 25.4 |
| 4 | Example I.8 | 420 | 11850 | 422 | 0.5 | 12066 | 1.8 | 433 | 3.1 | 13976 | 17.9 |
| 5 | Beckopox ® EP 075/3-methyl-2-butylamine MR 2:1 | 601 | 327 | 620 | 3.2 | 348 | 6.4 | 612 | 1.8 | 355 | 8.6 |
| 6 | 50% Example III.5/50% Beckopox ® EP 140 | 279 | 1226 | 285 | 2.2 | 1265 | 3.2 | 279 | 0 | 1270 | 3.6 |
| 7 | 50% Example III.1/50% Beckopox ® EP 140 | 289 | 1354 | 293 | 1.4 | 1497 | 10.6 | 298 | 3.1 | 1603 | 18.4 |
| 8 | Beckopox ® EP 075/cyclohexylamine MR 2:1 | 743 | 581 | 753 | 1.3 | 623 | 7.2 | 801 | 7.8 | 673 | 15.8 |
| 9 | Beckopox ® EP 075/2-amino-2-methyl-1-propanol MR 2:1 | 756 | 708 | 799 | 5.7 | 777 | 9.7 | 799 | 5.7 | 825 | 16.5 |
| 10 | Beckopox ® EP 075/2-ethylhexylamine MR 2:1 | 777 | 415 | 777 | 0 | 433 | 4.3 | 799 | 2.8 | 455 | 9.6 |
| 11 | Beckopox ® EP 075/isopropylamine MR 2:1 | 730 | 414 | 752 | 3.0 | 486 | 17.4 | 762 | 4.4 | 519 | 25.4 |

TABLE 2

Storage stabilities of amine-modified epoxy resins at room temperature

| | | Initial values | | | after x months | |
| Example III | Reaction product of epoxy resin and amine | EV | visc. 25° C. mPa · s | X | EV | Visc. 25° C. mPa · s |
|---|---|---|---|---|---|---|
| 12a) | Example I.1" | 688 | 386 | 15 | 688 | 434 |
| b) | Example I.1" | 688 | 386 | 3 | 688 | 400 |
| 8 | Beckopox ® EP 075/cyclohexylamine MR 2:1 | 743 | 581 | 4 | 743 | 610 |
| 9 | Beckopox ® EP 075/2-amino-2-methyl-1-propanol MR 2:1 | 756 | 708 | 3 | 756 | 726 |
| 10 | Beckopox ® EP 075/2-ethylhexylamine MR 2:1 | 777 | 415 | 3 | 775 | 429 |
| 11 | Beckopox ® EP 075/isopropylamine MR 2:1 | 730 | 414 | 14 | 744 | 474 |

TABLE 3

Compositions and test results for the elastic coatings

| Examples II | 1 | 2 | 3 | 4 | 5 | 6 | 7 | 8 | 9 | 10 | 11 |
|---|---|---|---|---|---|---|---|---|---|---|---|
| Epoxy resin according to 1 | | | | | | | | | | | |
| Example 1 | 50 | 50 | 50 | 60 | 70 | | | | | | |
| Example 2 | | | | | | 60 | 50 | | | | |
| Example 3 | | | | | | | | 60 | | | |
| Example 4 | | | | | | | | | 50 | | |
| Example 5 | | | | | | | | | | 50 | |
| Example 6 | | | | | | | | | | | 100 |
| Example 7 | | | | | | | | | | | |
| Example 8 | | | | | | | | | | | |
| Example 9 | | | | | | | | | | | |
| Example 10 | | | | | | | | | | | |
| 1) Beckopox ® EP 140 (EV 183) | 50 | 50 | 40 | 40 | 30 | 40 | 50 | 40 | 50 | 50 | |
| 1) Beckopox ® EP 301 (EV 475) | | | 10 | | | | | | | | |
| 2) Grilonit RV 1812 (EV 142) | | | | | | | | | | | |
| 3) Beckopox ® EP 075 (EV 340) | | | | | | | | | | | |
| Epoxy resin hardener | | | | | | | | | | | |
| 4) Beckopox ® special hardener EH 610 (HAV 95) | 33.3 | | 30.1 | 29.1 | 24.7 | 26.2 | 30.4 | 25.1 | 29.9 | 35.6 | 10.4 |
| 5) Beckopox ® special hardener EH 624 (HAV 80) | | 27.2 | | | | | | | | | |
| 6) Beckopox ® special hardener VEH 2621 (HAV 113) | | | | | | | | | | | |
| Pot life at 23° C. in h | 0.4 | 3 | 1.5 | 3 | >8 <24 | 3.5 | 0.5 | 2.5 | 0.7 | 0.2 | >8 <24 |
| Drying dust dry in h (in accordance with DIN 53 150) | 7 | 7 | 6 | >8 <24 | 96 | >8 <24 | 6 | >8 <24 | >8 <24 | 6 | >7 |
| Surface adhesive after 24 h (Assessment in accordance with DIN 53 230) | 0 | 0 | 0 | 1 | 4 | 0 | 0 | 2 | 0 | 1 | 4 |
| Pendulum hardness after 7 days in s (in accordance with DIN 53 157) | 17 | 23 | 17 | 10 | | 17 | 32 | 17 | 17 | 18 | |
| 7) Elasticity | | | | | | | | | | | |
| (a) after 7 days at room temperature | +++ | ++ | + | +++ | +++ | ++ | ++ | ++ | ++ | ++ | +++ |
| (b):(a) + 5 h at 60° C. | +++ | ++ | + | +++ | +++ | ++ | ++ | ++ | ++ | ++ | +++ |
| (c):(b) + 24 h at −20° C. | ++ | + | + | +++ | ++ | ++ | ++ | ++ | hard breaks | hard breaks | ++ |
| Bending of the sheet cooled to −20° C. (c) by 180° C. | no break | tears from edge | no break | no break | no break | no break | tears from edge | no break | | | no break |

| Examples II | 12 | 13 | 14 | 15 | 16 | 17 | 18 | 19 | 20 | 21 | 22 |
|---|---|---|---|---|---|---|---|---|---|---|---|
| Epoxy resin according to 1 | | | | | | | | | | | |
| Example 1 | | | | | | | | | | | |
| Example 2 | | | | | | | | | | | |
| Example 3 | | | | | | | | | | | |
| Example 4 | | | | | | | | | | | |
| Example 5 | | | | | | | | | | | |
| Example 6 | 100 | 70 | | | | | | | | | |
| Example 7 | | | 100 | 100 | | | | | | | |
| Example 8 | | | | | 100 | 100 | | | | | |
| Example 9 | | | | | | | 100 | 100 | 85 | | |
| Example 10 | | | | | | | | | | 80 | 80 |
| 1) Beckopox ® EP 140 (EV 183) | | 20 | | | | | | | 15 | | |
| 1) Beckopox ® EP 301 (EV 475) | | | | | | | | | | | |
| 2) Grilonit RV 1812 (EV 142) | | 10 | | | | | | | | | |
| 3) Beckopox ® EP 075 (EV 340) | | | | | | | | | | 20 | 20 |
| Epoxy resin hardener | | | | | | | | | | | |
| 4) Beckopox ® special hardener EH 610 (HAV 95) | | 23.6 | 9.7 | | 22.8 | | 18.0 | | | 14.5 | |
| 5) Beckopox ® VEH 624 (HAV 80) | 8.8 | | | 8.1 | | 19.2 | | | 19.4 | | 12.2 |
| 6) Beckopox ® special hardener VEH 2621 (HAV 113) | | | | | | | | 21.4 | | | |
| Pot life at 23° C. in h | >8 <24 | 2 | >8 <24 | >8 <24 | 3.3 | 5 | 4 | >8 <24 | 4 | >8 <24 | >8 <24 |
| Drying dust dry in h | 48 | >8 <24 | 96 | 96 | >8 <24 | 1 | 7 | 4 | 4 | 96 | 96 |
| Surface adhesive after 24 h (Assessment in accordance with DIN 53 230) | 4 | 2 | 4 | 4 | 0 | 2 | 2 | 0 | 1 | 4 | 4 |
| Pendulum hardness after 7 days in s (in accordance with DIN 53 157) | | 10 | | | 27 | 17 | 6 | 19 | 37 | | 15 |
| 7) Elasticity | | | | | | | | | | | |
| (a) after 7 days at room temperature | +++ | ++ | +++ | +++ | +++ | ++ | +++ | +++ | +++ | +++ | +++ |
| (b):(a) + 5 h at 60° C. | +++ | ++ | +++ | +++ | +++ | ++ | +++ | +++ | +++ | +++ | +++ |

TABLE 3-continued

Compositions and test results for the elastic coatings

| (c):(b) + 24 h at −20° C. Bending of the sheet cooled to −20° C. (c) by 180° C. | ++ no break | hard breaks | ++ no break | ++ no break | ++ no break | ++ no break | + no break | hard tears from edge | hard breaks | ++ no break | ++ no break |
|---|---|---|---|---|---|---|---|---|---|---|---|

TABLE 4

Mechanical parameters of the shaped bodies made of various resin/hardener combinations

| Examples IV | | 1 | 2 | 3 | 4 | 5 | 6 | Beckopox EP 140[1]/ Standard hardener[10] Comparison |
|---|---|---|---|---|---|---|---|---|
| Resin according to Ex. I.1 (EV 737) | pbw | 50 | 50 | 60 | | | | |
| Resin according to Ex. 12 (EV 1111) | pbw | | | | 50 | | | |
| Resin according to Ex I.11 (EV 651) | pbw | | | | | 50 | 50 | |
| Beckopox EP 140 (EV 183)[1] | pbw | 50 | 50 | 40 | 50 | 50 | 50 | |
| Beckopox special hardener EH 610 (HAV 95)[4] | pbw | 33.3 | | | | 32.3 | | |
| AEP hardener (HAV 86)[8] | pbw | | 30.1 | | | | 29.3 | |
| Hardener LH 842 (HAV 93)[9] | pbw | | | 27.9 | 29.8 | | | |
| Pendulum hardness after 7 days in s (DIN 53157) | | 21 | 27 | 14 | 73 | 14 | 28 | ca. 200 |
| Tensile strength in N/mm² 23° C. | | 4.4 | 2.5 | 1.8 | 5.0 | 7.8 | 2.4 | ca. 45 |
| Tensile strength in N/mm² 0° C. | | 18.4 | 11.6 | 6.1 | 28.7 | 25.2 | 11.3 | ca. 35 |
| Tensile strength in N/mm² 20° C. | | 47.4 | 27.5 | 21.5 | 26.4 | 47.6 | 28.3 | ca. 35 |
| Elongation at break in % 23° C. | | 56.3 | 55.6 | 33.9 | 58.5 | 72.7 | 45.8 | ca. 2 |
| Elongation at break in % 0° C. | | 42.5 | 61.3 | 47.5 | 20.9 | 48.8 | 47.6 | ca. 1 |
| Elongation at break in % −20° C. | | 22.2 | 27.7 | 30.1 | 34.9 | 20.2 | 19.1 | ca. 1 |
| E modulus in N/mm² 23° C. | | 7.6 | 5.1 | 5.7 | 15.9 | 17.4 | 5.4 | ca. 3000 |
| E modulus in N/mm² 0° C. | | 353.2 | 66.6 | 17.2 | 638.6 | 585.6 | 96.7 | ca. 4000 |
| E modulus in N/mm² −20° C. | | 1212.3 | 588.5 | 421.6 | 755.3 | 1221.2 | 650.3 | ca. 3500 |

What is claimed is:

1. An epoxy bulk resin composition consisting of (A) a compound which contains at least two 1,2-epoxide groups and which is the reaction product of a reaction mixture consisting of
  (A1) one or more compounds containing at least two 1,2-epoxide groups, optionally in admixture with one or more monoepoxides, and
  (A2) one or more amines selected from
    (A21) amines of the formula I

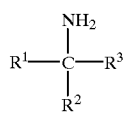

where $R^1$ is an aliphatic, cycloaliphatic, araliphatic or aromatic hydrocarbon radical, each of which may be branched or unbranched, each having from 1 to 30 carbon atoms, each which may be unsubstituted or substituted by one or more of hydroxy, alkoxy, or halogen groups, $R^2$ and $R^3$ are each, independently of one another, hydrogen or one of the radicals specified under $R^1$, with the proviso that in the case of $R^2$ and $R^3$ being hydrogen, the remaining radical $R^1$ is one of the following substituents

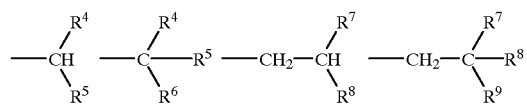

where the radicals $R^4$ to $R^9$ are each, independently of one another, an aliphatic, cycloaliphatic, araliphatic or aromatic hydrocarbon radical, each of which may be branched or unbranched, each having from 1 to 30 carbon atoms, each of which may be unsubstituted or substituted by one or more of hydroxy, alkoxy, or halogen groups, and $R^1$ and $R^2$ can form a cycloaliphatic ring having up to 8 carbon atoms, which may be unsubstituted or substituted with one or more of lower alkyl, lower alkoxy, halogen, or dialkyl amino groups, where $R_3$ is then a hydrogen atom, or (A22) amines of the formula II $$R^{10}\left((OCH_2-\underset{R^{13}}{CH})_x-NH-CH\underset{R^{12}}{\overset{R^{11}}{\diagup}}\right)_f \quad \text{II}$$

where $R^{10}$ is 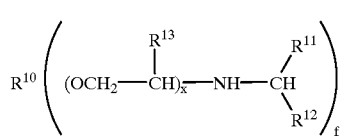 or

-continued

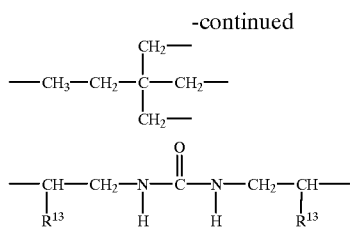

R$^{11}$ and R$^{12}$ are each, independently of one another, hydrogen, a saturated or unsaturated straight-chain, branched or cyclic, with or without heteroatoms in the ring, alkyl having up to 15 carbon atoms, or R$^{11}$ and R$^{12}$ together can form a cyclic alkylene radical having up to 8 carbon atoms, which is unsubstituted or monosubstituted, disubstituted or trisubstituted by alkyl groups having from 1 to 3 carbon atoms,
R$^{13}$ is hydrogen or methyl,
x is an integer from 1 to 100, and
f is 2 or 3,
wherein the
R$^{11}$, R$^{12}$, and R$^{13}$ groups can vary in the repeating units; or
(A23) diprimary diamines of the formula III

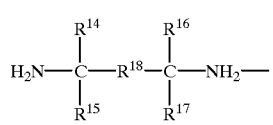

where
R$^{14}$ to R$^{17}$ are independently hydrogen or an alkyl group having from 1 to 8 carbon atoms, and
R$^{18}$ is a direct bond, a linear, branched or cyclic, alkylene group, which may be unsubstituted or substituted with one or more of lower alkyl, lower alkoxy, halogen, or dialkyl amino groups, or an arylene or heteroarylene group, or
R$^{14}$ together with R$^{16}$ or R$^{18}$ and the atoms connecting them can form a cycloaliphatic, aromatic, or heteroaromatic ring
with the proviso that at least one of the radicals R$^{14}$ to R$^{17}$ is an alkyl group if R$^{18}$ is a direct bond or a linear alkylene group;
the amounts of substances (A1) and (A2) being chosen in such ratio that at least two epoxide groups per molecule of (A) are retained,
(B) optionally one or more 1,2-epoxide compounds which is different from that of (A1) or is the unreacted proportions of the compounds (A1) from the preparation of the compounds (A),
(C) one or more hardeners.

2. A composition as claimed in claim 1, wherein the compound (A1) has an epoxide equivalent weight of from 100 to 500 g/mol.

3. A composition as claimed in claim 2, wherein the compound (A1) comprises glycidyl ethers of bisphenol A or bisphenol F.

4. A composition as claimed in claim 1, wherein the compound (A1) comprises one or more polyoxyalkylene glycol diglycidyl ethers.

5. A composition as claimed in claim 4, wherein the compound (A1) comprises one or more polyoxypropylene glycol diglycidyl ethers.

6. A composition as claimed in claim 1, wherein the amines (A2) comprise t-alkylamines having from 4 to 22 carbon atoms.

7. A composition as claimed in claim 1, wherein the amines (A2) comprise t-alkylamines having from 12 to 14 carbon atoms.

8. A composition as claimed in claim 1, wherein the amines (A2) comprise amines of the formula

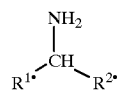

in which R$^{1'}$ and R$^{2'}$ are as defined for R$^1$, or alternatively R$^{1'}$ and R$^{2'}$ can form a cycloaliphatic ring having up to 8 carbon atoms which may be unsubstituted or substituted with one or more of lower alkyl, lower alkoxy, halogen, or dialkyl amino groups.

9. A composition as claimed in claim 8, wherein the amine (A2) comprises 2-aminobutane.

10. A composition as claimed in claim 8, wherein the amine (A2) comprises cyclohexylamine.

11. A composition as claimed in claim 8, wherein the amine (A2) comprises 2-ethylhexylamine.

12. A composition as claimed in claim 8, wherein the amine (A2) comprises neopentanediamine.

13. A composition as claimed in claim 1, wherein the compounds (A) are reaction products of polyoxypropylene glycol diglycidyl ethers (A1) and 2-aminobutane (A2) and the compounds (B) are present and are selected from one or more of diglycidyl ethers of bisphenol A and bisphenol F.

14. A composition as claimed in claim 1, wherein the hardener (C) comprises aminoethylpiperazine.

15. A composition as claimed in claim 1, wherein the hardener (C) comprises a mixture of aminoethylpiperazine and one or both of nonylphenol and benzyl alcohol.

16. A composition as claimed in claim 1, wherein the hardener (C) comprises latent hardeners.

17. A composition as claimed in claim 1, wherein the hardener (C) comprises dicyandiamide.

18. A composition as claimed in claim 1, wherein the hardener (C) comprises polyesters containing carboxyl groups.

19. A composition as claimed in claim 18, wherein the polyesters containing carboxyl groups (C) have an acid number of from 15 to 150 mg KOH/g and a number average molecular weight $M_n$ of from 600 to 12000 g/mol.

20. A composition as claimed in claim 1, wherein the hardeners (C) comprise one or more compounds of the formula III or IV

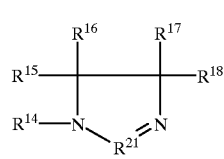

III

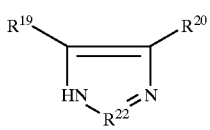

where $R^{14}$ to $R^{20}$ are, independently of one another, hydrogen or an alkyl, aryl, aralkyl, cycloalkyl or heterocyclic radical, $R^{21}$ and $R^{22}$ are selected from the radicals specified for $R^{14}$ to $R^{20}$ or are an alkylene or arylene radical which can be unsubstituted or substituted by one or more alkyl, aryl, aralkyl, cycloalkyl or heterocyclic radicals, and where a plurality of radicals can optionally be bonded via heteroatoms.

21. A composition as claimed in claim 1, wherein the hardener (C) comprises 2-phenylimidazoline.

22. A crack-bridging coating, comprising a composition as claimed in claim 1.

23. An adhesive comprising a composition as claimed in claim 1.

24. A powder surface coating comprising a composition as claimed in claim 1.

25. A substrate covered with a composition as claimed in claim 1.

26. An epoxy bulk resin composition consisting of
(A) a compound which contains at least two 1,2-epoxide groups and which is the reaction product of a reaction mixture consisting of
  (A1) one or more compounds containing at least two 1,2-epoxide groups, optionally in admixture with one or more monoepoxides, and
  (A2) one or more amines selected from (A21) amines of the formula I

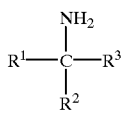

where
  $R^1$ is an aliphatic, cycloaliphatic, araliphatic or aromatic hydrocarbon radical, each of which may be branched or unbranched, each having from 1 to 30 carbon atoms, each which may be unsubstituted or substituted by one or more of hydroxy, alkoxy, or halogen groups,
  $R^2$ and $R^3$ are each, independently of one another, hydrogen or one of the radicals specified under $R^1$, with the proviso that in the case of $R^2$ and $R^3$ being hydrogen, the remaining radical $R^1$ is one of the following substituents

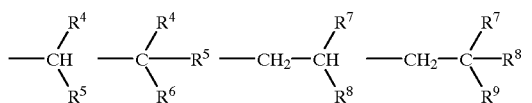

where the radicals
  $R^4$ to $R^9$ are each, independently of one another, an aliphatic, cycloaliphatic, araliphatic or aromatic hydrocarbon radical, each of which may be branched or unbranched, each having from 1 to 30 carbon atoms, each of which may be unsubstituted or substituted by one or more of hydroxy, alkoxy, or halogen groups, and $R^1$ and $R^2$ can form a cycloaliphatic ring having up to 8 carbon atoms, which may be unsubstituted or substituted with one or more of lower alkyl, lower alkoxy, halogen, or dialkyl amino groups, where $R_3$ is then a hydrogen atom, or
(A22) amines of the formula II $$R^{10}\left((OCH_2-\underset{R^{13}}{CH})_{\overline{x}}-NH-\underset{R^{12}}{\overset{R^{11}}{CH}}\right)_f$$  II where $R^{10}$ is 
$-\underset{R^{13}}{CH}-CH_2-\quad -CH_2-\underset{}{CH}-CH_2-$ or $-CH_3-CH_2-\underset{\underset{CH_2-}{|}}{\overset{\overset{CH_2-}{|}}{C}}-CH_2-$ $-\underset{R^{13}}{CH}-CH_2-N-\overset{\overset{O}{\|}}{C}-N-CH_2-\underset{R^{13}}{CH}-$
           $\quad\quad\quad H \quad\quad H$ $R^{11}$ and $R^{12}$ are each, independently of one another, hydrogen, a saturated or unsaturated straight-chain, branched or cyclic, with or without heteroatoms in the ring, alkyl having up to 15 carbon atoms, or $R^{11}$ and $R^{12}$ together can form a cyclic alkylene radical having up to 8 carbon atoms, which is unsubstituted or monosubstituted, disubstituted or trisubstituted by alkyl groups having from 1 to 3 carbon atoms, $R^{13}$ is hydrogen or methyl, x is an integer from 1 to 100, and f is 2 or 3, wherein the
$R^{11}$, $R^{12}$ and $R^{13}$ groups can vary in the repeating units;
or
(A23) diprimary diamines of the formula III $$H_2N-\underset{R^{15}}{\overset{R^{14}}{C}}-R^{18}-\underset{R^{17}}{\overset{R^{16}}{C}}-NH_2-$$  III where
  $R^{14}$ to $R^{17}$ are independently hydrogen or an alkyl group having from 1 to 8 carbon atoms, and
  $R^{18}$ is a direct bond, a linear, branched or cyclic, alkylene group, which may be unsubstituted or substituted with one or more of lower alkyl, lower alkoxy, halogen, or dialkyl amino groups, or an arylene or heteroarylene group, or
  $R^{14}$ together with $R^{16}$ or $R^{18}$ and the atoms connecting them can form a cycloaliphatic, aromatic, or heteroaromatic ring with the proviso that at least one of the radicals $R^{14}$ to $R^{17}$ is an alkyl group if $R^{18}$ is a direct bond or a linear alkylene group, the amounts of substances (A1) and (A2) being chosen in such ratio that at least two epoxide groups per molecule of (A) are retained,
(B) optionally one or more 1,2-epoxide compounds which is different from that of (A1) or is the unreacted proportions of the compounds (A1) from the preparation of the compounds (A),
(C) one or more hardeners, and
(D) one or more further additives selected from the group consisting of accelerators, pigments, pigment pastes, dyes, antioxidants, stabilizers, levelling agents, thickening agents, antifoaming agents, wetting agents, reactive diluents, coupling agents, hydrophobicizing agents, and flame inhibitors.

* * * * *